United States Patent [19]

Akazawa

[11] Patent Number: 4,867,873
[45] Date of Patent: Sep. 19, 1989

[54] FRIER INCORPORATING FILTERING MECHANISM

[75] Inventor: Hozumi Akazawa, Kobe, Japan

[73] Assignee: Chojoha Giken Kabushiki Kaisha, Hyogo, Japan

[21] Appl. No.: 867,011

[22] Filed: May 27, 1986

[30] Foreign Application Priority Data

May 30, 1985 [JP] Japan .................................. 60-117979

[51] Int. Cl.$^4$ ............................................ B01D 33/04
[52] U.S. Cl. ...................... 210/106; 210/167; 210/194; 210/386; 210/387; 210/DIG. 8; 99/408
[58] Field of Search ................. 210/97, 106, 167, 386, 210/387, 435, DIG. 8, 194; 99/408

[56] References Cited

U.S. PATENT DOCUMENTS

| | | | |
|---|---|---|---|
| 3,335,862 | 8/1967 | Hirs | 210/387 |
| 3,581,896 | 6/1971 | Kuhlman | 210/167 |
| 3,648,842 | 3/1972 | Zievers | 210/387 |
| 3,797,378 | 3/1974 | Morris | 99/408 |
| 3,977,973 | 8/1976 | Anderson | 99/408 |
| 4,643,824 | 2/1987 | Akazawa et al. | 210/167 |

*Primary Examiner*—Richard V. Fisher
*Attorney, Agent, or Firm*—Burns, Doane, Swecker & Mathis

[57] ABSTRACT

A frier incorporating filtering mechanism wherein a frier housing for frying food with edible oil contained and heated therein includes a partition disposed to define in the housing a suction space and to allow the oil to pass therethrough, a filtering web is provided to be movable at a part of the web along and over the partition, and the oil led through the web and suction space to the exterior of the housing is circulated back through a pump to the housing at a position higher than the partition, whereby impurities are kept being filtered out of the oil under use within the frier housing for frying even a large amount of food, to remarkably lower inherent oxidation of the oil.

4 Claims, 4 Drawing Sheets

FRIER INCORPORATING FILTERING MECHANISM

TECHNICAL BACKGROUND OF THE INVENTION

This invention relates to a frier incorporating filtering mechanism and, more specifically, to a frier of which a housing itself serves also as a filtering housing and thus comprises constituent members of the filtering mechanism mounted directly to the housing.

The frier of the type referred to is arranged as to fry a large quantity of food within a large volume of heated edible oil and are utilized mostly in the field of, for example, dine-out or fast-food industry.

DISCLOSURE OF PRIOR ART

In frying a large quantity of food, it is required to exchange the oil used with a fresh oil more frequently as the food quantity increases, since otherwise impurities accumulated and tending to attach to frying foods and the oxidation of oil promoted will quickly render the fried foods to become unpalatable. Such exchange of oil with new one involving discard of used oil has been greatly cumbersome, and yet it has been demanded to reduce the cost of oil in the particular field involving the large quantity food frying.

In order to resolve the above problems, there has been suggested such an arrangement that a frier is coupled through oil suction and discharge pumps to a filtering tank having a filtering paper disposed between oil inlet and outlet ports of the tank to filter the impurities out of the oil introduced into the tank from the frier by the suction pump, and thus cleaned oil is circulated again to the frier by the discharge pump. Since the impurities are filtered out of the oil to prevent the oil from its oxidation to some extent, it is possible to prolong the durability of oil and to lower its cost.

The high viscocity of the edible oil renders, however, the impurities of a relatively larger amount to easily stay in the oil, and the filtering paper in the foregoing known arrangement is caused to clog in a short time and required to be exchanged frequently. Yet, the oil temperature is very high and the entire filtering tank including the filtering paper becomes also very hot so that the frequent manual exchange of the filtering paper must be performed after a sufficient time for cooling the oil and tank, and the filtering has been still much troublesome. In order to increase the filtering capacity of the known arrangement, on the other hand, it has been required to increase the filtering area by enlarging the filtering tank or by providing many pleats in the filtering paper, which measure has resulted rather in that the required costs for the filtering become considerably high, while the cost of oil itself can only be reduced.

TECHNICAL BACKGROUND OF THE INVENTION

A primary object of the present invention is, therefore, to provide a frier incorporating a filtering mechanism which can eliminate the foregoing problems, allowing this the filtering performed continuously without requiring time consuming manual exchange of the filtering paper, a relatively large filtering capacity made achievable by the frier itself without any separate large filtering tank, and the required costs not only of the oil but also of the filtering remarkably reduced.

According to the present invention, this object is attained by providing a frier incorporating a filtering mechanism, comprising a frier housing, a partition member disposed within the housing for defining therein an oil suction space and passaging oil therethrough, a filtering member partly disposed on the partition member to be movable therealong, means for moving the filtering member, an outlet provided in the frier housing to guide oil through the suction space to the exterior of the housing, an inlet provided in the housing to guide oil into the housing at a level higher than the partition member defining the suction space, and a pump disposed between the outlet and inlet to circulate oil from the outlet to the inlet.

In the frier of the present invention, the impurities generated within the frier can be continuously filtered out within the frier itself without requiring cumbersome manual exchange of the filtering member nor any need of a separate filtering tank or the like, the filtering capacity can be enlarged even with a small capacity of the frier itself, and the oxidation of oil can be effectively prevented by the continuous impurity filtering.

Other objects and advantages of the present invention shall become clear from the following description of the invention detailed with reference to a preferred embodiment shown in accompanying drawings.

Figure 1:
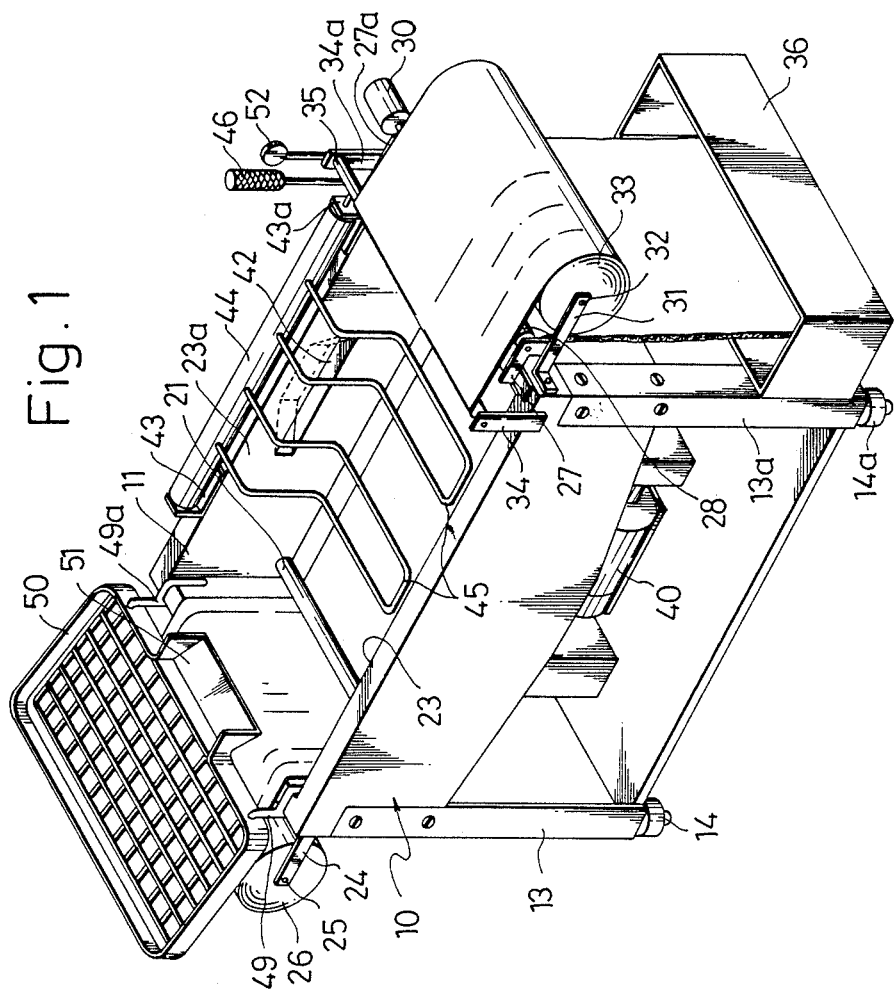
FIG. 1 is a perspective view of a frier incorporating filtering mechanism according to the present invention.

While the present invention shall now be described with reference to the preferred embodiment shown in the drawings, it should be understood that the intention is not to limit the invention only to the particular embodiment shown but rather to cover all alterations, modifications and equivalent arrangements possible within the scope of appended claims.

DISCLOSURE OF PREFERRED EMBODIMENT

Figure 2:
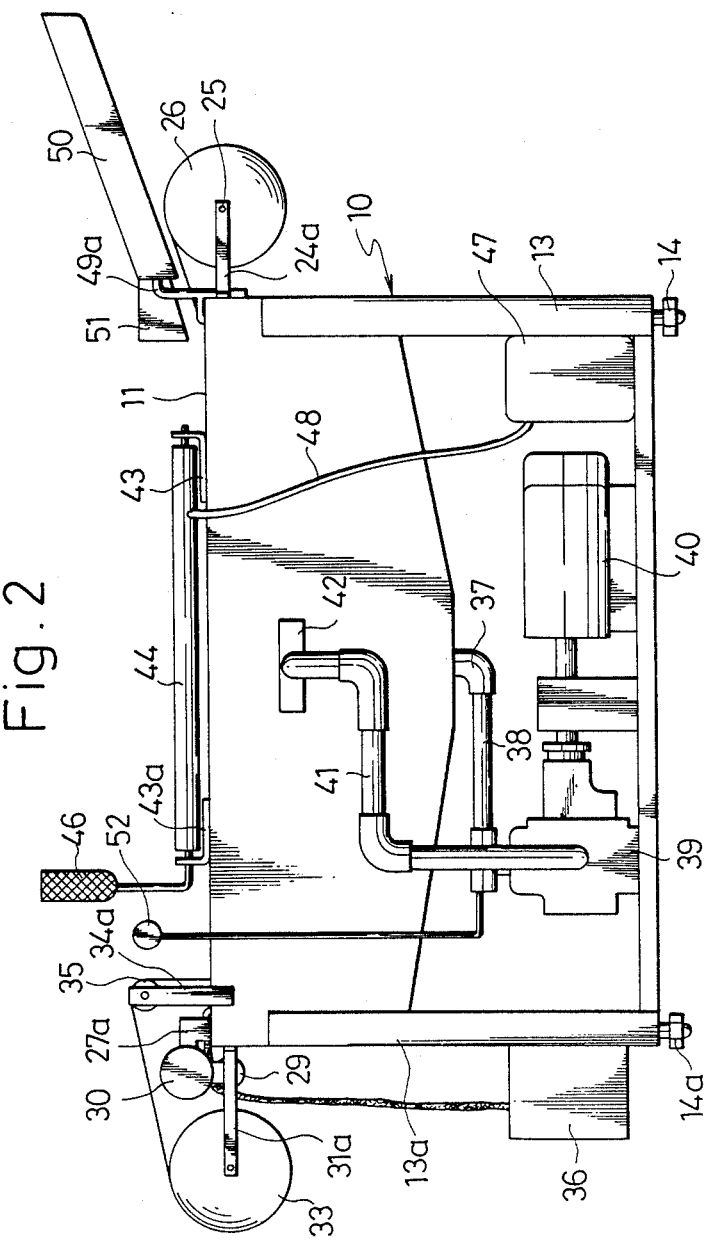
FIG. 2 is a side view of the frier of FIG. 1.
Figure 3:
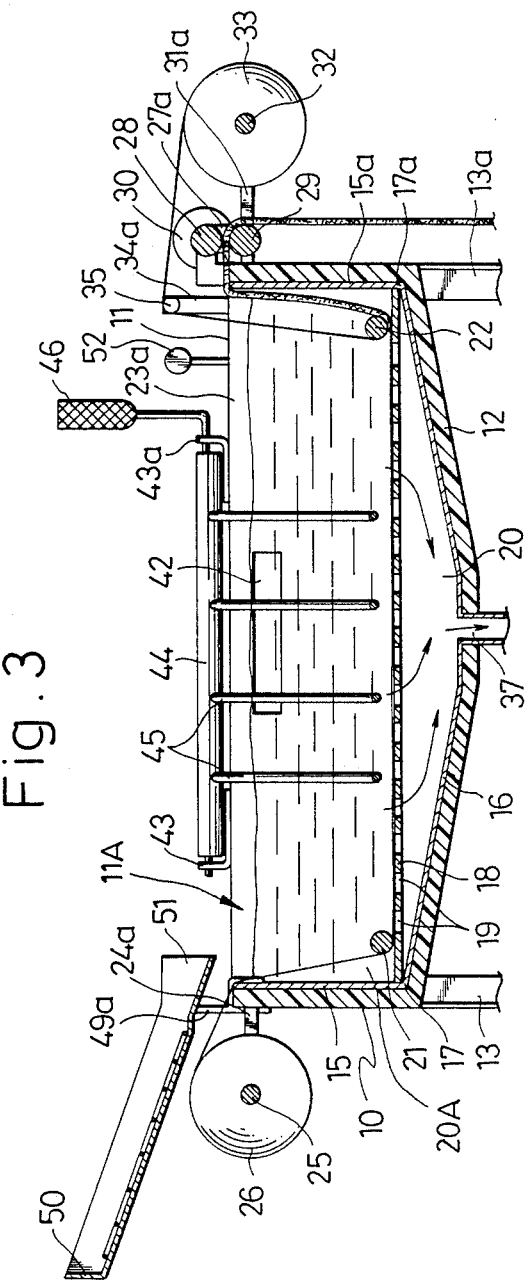
FIG. 3 is a vertically sectioned view at the upper part of the frier of FIG. 1 taken in its longitudinal direction.
Figure 4:
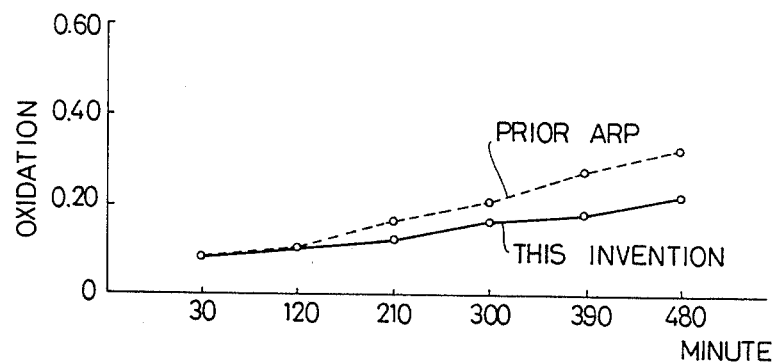
FIG. 4 is a diagram showing comparative tests of edible oil subjected to the filtering by a conventional filtering tank and by the frier of the present invention, with respect to the oxidation degree of the oil with time elapsed.
Figure 5:
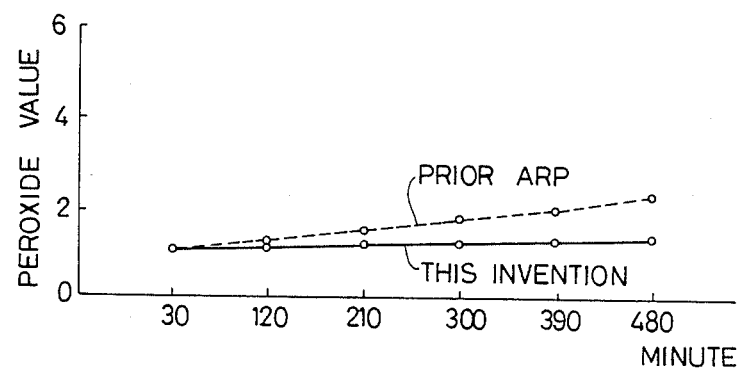
FIG. 5 is a diagram showing comparative tests also of the edible oil subjected to the filtering by the conventional filtering tank and by the frier of the present invention, with respect to the peroxide value with time elapsed.

Referring to FIGS. 1 to 3, there is shown a frier 10 which is provided with a filtering mechanism for preventing the oxidation of edible oil, in addition to ordinary food frying function. The frier 10 comprises a housing 11 opened on the top side and defining therein a cooking chamber 11A which accommodates the oil. The housing 11 is preferably provided all over the outer surface with a layer of such a heat resisting material 12 as a rock wool. Fixed to four outer bottom corners of the housing 11 are two pairs of legs 13 and 13a by means of, for example, screws, and casters 14 and 14a are provided to lower ends of these legs. A partition plate 18 is disposed within the housing 11 to extend horizontally across both longitudinal bottom corner edges 17 and 17a where substantially vertical plates 15 and 15a at both longitudinal ends and a centrally slanted bottom plate 16 are joined. The partition plate 18 is provided with many perforations 19 through which oil is freely passed. Thus an oil suction space or filtered oil zone 20 is defined at the inner bottom section of the housing 11 by the partition plate 18 and bottom plate 16. The portion of the chamber 11A disposed above the plate 18 constitutes a frying zone 20A.

Disposed in the vicinity of the corner edges 17 and 17a of the housing 11 with which the both longitudinal ends of the partition plate 18 engage are guide rollers 21 and 22 which extend in the width direction of the housing 11. These guide rollers 21 and 22 are held between both side plates 23 and 23a of the housing 11 for free rotation by engaging pivot pins (not shown) projected from both ends of the respective rollers 21 and 22 in opposing recesses provided in the side plates 23 and 23a. The rollers 21 and 22 are preferably spaced slightly from the upper surface of the partition plate 18 by a distance smaller than the thickness of a later described filter web. Horizontally extended from an outer longitudinal end surface of one end plate 15 of the housing 11 are a pair of pivot arms 24 and 24a, between which a filter roller 25 is rotatably connected, and a filter web 26 having a width slightly smaller than the inner width dimension of the housing 11 is wound on the roller 25. The filter web is preferably made of an inexpensive, nonwoven filtering paper which allows the edible oil to pass therethrough but prevents such impurities as fried foods' fractions and the like impurities from passing therethrough.

Fixedly mounted on the top end surface of the other end plate 15a of the housing 11 are L-shaped support arms 27 and 27a extending their one bent leg downwardly out of the end plate 15a, and a pair of nip rollers 28 and 29 are rotatably supported between these extended ends of the arms in a vertically side-by-side relation. One of the pair of nip rollers 28 and 29, for example, the upper roller 28, is coupled directly to an output shaft of a motor 30 for rotation with an output of the motor 30 while the lower roller 29 is rotated directly, or indirectly through the filter web 26, by the upper roller 28 in reverse direction. A pair of pivot arms 31 and 31a are projected horizontally from the outer surface of the same end plate 15a, and a retentive paper roller 32 is rotatably supported between extended ends of these arms 31 and 31a, and a retentive paper web 33 having a width slightly smaller than the inner width dimension of the housing 11 is wound on the roller 32. This retentive web 33 may be of any material just enough for holding the impurities deposited on the filter web 26 and may not have any filtering function, but should be generally a thin material desirably. At the upper part of the side plates 23 and 23a and in the vicinity of the end plate 15a of the housing 11, a pair of vertically extended support arms 34 and 34a are provided, and a guide roller 35 is pivotably supported between them to guide the retentive paper web 33.

With this arrangement, a forward end of the filter web 26 is initially manually paid ut of the filter roller 25 and guided over the top end of the end plate 15 of the housing 11 through the guide rollers 21 and 22, lying over the partition plate 18 with the own weight of the filter web, to one nip rollers 28 and 29 to be held between them. On the other hand, the retentive paper web 33 is also led from the roller 32 through the guide rollers 35 and 22 also to the nip rollers to face the filter web 26 intimately above and below. As the motor 30 is energized, the upper and lower nip rollers 28 and 29 are rotated respectively counterclockwise and clockwise in FIGS. 1 and 3, the filter web 26 and retentive web 33 passed between the nip rollers 28 and 29 are subjected to a pulling force of the rollers 28 and 29, whereby the both webs 26 and 33 can be paid out of the both rollers 25 and 32, and downstream parts of the webs are sequentially discharged out of the rollers 28 and 29. Across the pair of legs 13a on the side of the end plate 15a, a web reception box 36 opened on the top side is mounted to receive the webs 26 and 33 used and dependingly discharged from the nip rollers 28 and 29.

The centrally slanted bottom plate 16 of the housing 11 is formed to have therein a downward open outlet 37, through which the oil passed through the filter web 26 and perforations 19 of the partition plate 18 into the suction space 20 is to be discharged. The outlet 37 is coupled through a duct 38 to a discharging pump 39 which is driven by a motor 40, while the pump 39 is coupled at its discharge part by a discharge duct 41 to an inlet 42 provided in one side plate 23a of the housing 11. This inlet 42 is positioned preferably at a level higher at least than the partition plate 18 so that the oil within the housing 11 is kept at a level higher than the partition plate 18.

Fixedly mounted on the top end of the side plate 23a of the housing 11 are pivot brackets 43 and 43a spaced in the longitudinal direction of the housing 11, and a heater supporter 44 is pivotably provided between these brackets. The supporter 44 is provided with rod heaters 45 which are bent into an L shape in a side view and extended into the interior of the housing 11. The supporter 44 is provided at one end with a lever 46 so that, in the illustrated embodiment, a rotation of the lever 46 to its horizontal position will hold the rod heaters 45 at a vertical position out of the housing 11. With the heaters 45 thus held at a vertical position, the user can clean the interior of the housing 11 or guide the filter web 26. The heaters 48 are electrically connected to a connecting wire 48 leading to a control unit 47 connectable to a commercial power source so that, when the heaters are connected to the power source, the oil within the frier housing 11 is heated to and maintained at a desired food frying temperature.

A dropping-oil receiving tray 50 is mounted on the top end of the end plate 15 of the housing 11 on the side having the filter roller 25, through holding legs 49 and 49a which is mounted to the plate 15 so as to provide to the tray 50 a proper spacing from the top end of the ed plate 15 as well as the filter web 26 for allowing the web 26 to be smoothly paid out. The tray 50 is provided to be proper for collecting oil which dropping from fried foods placed on the tray, returning the collected oil into the housing 11 through a discharge port 51 of the tray located above the housing 11.

An inlet of the pump 39 coupled to the duct 38 is also provided with a pressure switch 52 having a pressure gauge (not shown) which gives a visual indication of an oil pressure value as required. The pressure switch 52 is connected to the control unit 47 so that, when a control circuit (not shown) within the unit 47 receives an output signal from the switch 52, the circuit energizes the motor 30 to drive the nip roller 28. In particular, the control circuit preferably comprises a relay which is energized by the output signal of the pressure switch 52 so that a turning ON of the switch 52 responsive to an oil pressure exceeding a predetermined level in the inlet of the pump 39 causes the relay to be operated by the output signal to energize the motor 30. With such an arrangement, an oil pressure drop to be below a predetermined value at a position above the partition plate 18 causes the oil pressure in the inlet of the pump 39 to be increased beyond the predetermined level and the pressure switch 52 is turned ON to energize the motor 30 through the relay, whereby the motor 30 is continuously driven until the pressure in the pump inlet drops below the predetermined value and the pressure switch 52 is turned OFF. As a result, a length of the filter web 26 having its full filtering function can be always located on the partition plate 18.

In the illustrated embodiment, a pressure gauge is provided for visual observation of the pressure level in the inlet of the pump 39 so that the control unit 47 can be manually operated to operate the motor 30 prior to the ON operation of the pressure switch 52. The similar operation to the above can be achieved by applying the output signal of the pressure switch 52 to a timer circuit forming a control circuit, instead of the relay, and adjusting the set time of the timer circuit in correspondense to a time necessary for the motor 30 to replace the length of the filter web 26 on the partition plate 18 with a following new part of the filter web 26. In an event where, for example, the pump 39 is continuously driven by the motor 40 and the frying is performed for the same food continuously, the arrangement may be such that the motor 30 is intermittently energized by the timer circuit alone without using the pressure switch 52 or the like, because contamination rate of the filter web is to be substantially constant.

The operation of the frier 10 incorporating the filtering mechanism according to the present invention will be summarized.

Now, after a predetermined amount of edible oil is put in the frier housing 11, the heaters 45 are energized to heat the oil to a desired temperature. Simultaneously, the motor 40 is energized to drive the pump 39, and there is achieved a negative pressure in the suction space 20 below the partition plate 18. That is, the oil in the housing 11 is subjected to a suction force and drawn toward the pump 39 through the filter web 26, perforations 19 in the partition plate 18, suction space 20, outlet 37 and inlet duct 38. The oil is circulated from the outlet 37 of the pump 39 through the discharge duct 41 and inlet 42 again into the housing 11, completing a continuous circulation path of oil.

While the food is continuously fried within the housing 11, impurities that cause the oil to be oxidized become entrained in the oil, and the oil circulation by the pump 39 causes the impurities filtrated by the filter web 26 to be deposited thereon. As the impurity deposition accumulates on the filter web 26, the pressure in the inlet of the pump 39 increases enough to actuate the pressure switch 52 for driving the motor 30, and the contaminated part of the filter web 26 on the partition plate 18 is moved and replaced by the following new part of the web. In this case, the pressure switch 52 is set to be operated preferably at 300 to 500 mm/Hg. During the removal of the contaminated filter web part, the retentive paper web 33 is delivered from the roller 32 through the guide rollers 35 and 22 over the filter web 26 to cover it on the upper side. At this time, the both webs 26 and 33 are subjected to a proper tension occurring between the guide roller 22 and the nip rollers 28 and 29, so that the impurities of the fried foods fractions deposited on the filter web 26 are stably carried as held between the webs 26 and 33 to be collected in the box 36 without falling back into the oil in the housing 11. When the foregoing operation is repeated during the frying of food, the edible oil in the housing 11 is subjected to the filtering continuously automatically, without requiring frequent manual exchange of the filtering member as in the prior art.

The frier having the filtering mechanism of such arrangement as has been described and the known frier connected to a separate filtering means were tested with respect to the oxidation and peroxide value for comparison with each other. In the tests, 30 lit. of edible oil was put in the friers and kept at a temperature of 180° C., and the friers were subjected to a continuous 8 hour operation, during which a 30 minute frying operation was conducted 6 times, conducting the second frying operation after a pause for 30 minutes upon completion of the first frying operation and the third and subsequent frying operations respectively with an interval of 1 hour after completion of the previous operation. In each of the 30 minute frying operations, 60 g of slices of fish were initially coated and 10 of such coated slices were fried in every 5 minutes. After completion of each frying operation, 400 ml of oil used was taken and subjected to an oxidation test according to Standard Oil Analysis Test Method of Japanese Oil Chemical Association, while the same amount of fresh oil as that taken for the measurement was supplemented after each operation, and results prove that, according to the frier of the present invention, the oil oxidation could have been limited to $\frac{2}{3}$ of that in the case of the known frier, of the type referred to in the introductory portion of this specification, after 8 hours lapsed.

A test of peroxide value was also carried out according to the above Method, results of prove that, according to the frier of the present invention, the peroxide value increases very slowly even after the long frying operation conducted.

Although the present invention has been described with reference to the embodiment in which the heater is dipped in the oil within the frier, it should be appreciated that the present invention may be modified in various ways. For example, the present invention is applicable similarly to an elongated bath type frier with a gas heater for a mass production, in which case, while the bottom part of the frier is placed above a gas burner, one longitudinal end part of the frier is to be disposed out of the gas burner, and major parts of the filtering mechanism in the present invention, that is, the filter roller 25, filter web 26, perforated partition plate 18, suction space 20, guide rollers 21 and 22, nip rollers 28 and 29, bottom outlet 37, inlet duct 38 and pump 39, as well as, preferably, the retentive paper roller 32, retentive paper web 33 and guide roller 35; are provided at the particular end part, whereas the outlet 42 for the oil passed through the filtering mechanism is provided at the other longitudinal end of the frier as coupled through the discharge duct 41 extended to the pump 39, whereby the oil in the elongated housing of the frier can be circulated throughout the housing longitudinally and impurities can be excellently effectively filtered out in the same manner as in the foregoing embodiment.

What is claimed as my invention is:
1. A frier comprising:
   a frier housing defining a cooking chamber having side walls and a bottom wall, and including heating means for heating oil in said chamber to a suitable cooking temperature,
   a perforated plate disposed in said chamber below an upper edge thereof for partitioning said chamber into a frying zone above said plate and a filtered oil zone between said plate and said bottom wall, an elongated filtering web disposed over said plate, means for periodically advancing said filtering web across said perforated plate to periodically replace a clogged portion of said web with an unclogged portion thereof, an oil outlet provided in said bottom wall, an oil inlet provided in a side wall of said housing in communication with said frying zone above said perforated plate, and oil circulating means communicating said outlet with said inlet and including a pump for continuously producing a negative pressure in said filtered oil zone to circulate oil from the latter to said frying zone, said filtered oil zone and frying zone being arranged such that substantially all of said negative pressure is communicated from said filtered oil zone to said frying zone for forcefully drawing the oil in the drying zone through said filtering web and into said filtered oil zone.

2. A frier according to claim 1, wherein said means for moving said filter web comprises nip rollers mounted at one end of said filter housing and gripping the filter web therebetween, a filter roller mounted at the other end of of the housing for carrying the filter web wound thereon, and guide rollers disposed in the vicinity of opposed ends of the housing and above said plate for retaining said filter web over said plate.

3. A frier comprising:

a frier housing defining an oil chamber having side walls and a bottom wall, and including heating means for heating oil in said chamber to a suitable cooking temperature, a perforated plate disposed in said chamber above said bottom wall for partitioning said chamber into a frying zone above said plate and a filtered oil zone between said plate and said bottom wall, an elongated filtering web disposed over said plate and arranged to be advanced thereacross, advancing means on said housing for advancing said filtering web across said plate, said advancing means comprising:

a pair of nip rollers mounted to a first end of said housing, at least one of said nip rollers being periodically driven to advance said filtering web held between said nip rollers, so as to periodically replace a clogged portion of said filtering web with an unclogged portion thereof, a filter roller mounted to a second end of said housing opposing said first end, said filtering web wound around said filter roller, first and second guide rollers disposed in said chamber adjacent said first and second ends respectively, said guide rollers spaced slightly above said plate and above said filtering web to hold said filtering web upon said plate, a third guide roller disposed above said chamber adjacent said first end of said housing, a retentive paper roller mounted at said first end of said housing and carrying a retentive paper web which is payed-out for travel around said third and first guide rollers and between said nip rollers atop said filtering web, an oil outlet in said bottom wall, an oil inlet in a side wall of said housing above said plate, and oil circulating means communicating said oil outlet with said oil inlet and including a pump for continuously producing a negative pressure in said filtered oil zone to circulate filtered oil from said filtered oil zone to said frying oil zone, said filtered oil zone and said frying oil zone being arranged such that substantially all of said negative pressure is communicated from said filtered oil zone to said frying zone for forcefully drawing the oil in said frying zone through said filtering web and into said filtered oil zone.

4. A frier according to claim 3, wherein said filtering web is formed of a non-woven paper material, and said retentive paper web is thinner than said filtering web.

* * * * *